US011051456B2

(12) United States Patent
Sloan et al.

(10) Patent No.: US 11,051,456 B2
(45) Date of Patent: Jul. 6, 2021

(54) BALE WEIGHT MEASUREMENT AND CONTROL SYSTEM USING LIFTGATE

(71) Applicant: Deere & Company, Moline, IL (US)

(72) Inventors: Charles S. Sloan, Blakesburg, IA (US); Daniel E. Derscheid, Hedrick, IA (US); Stephen E. O'Brien, Ottumwa, IA (US)

(73) Assignee: Deere & Company, Moline, IL (US)

( * ) Notice: Subject to any disclaimer, the term of this patent is extended or adjusted under 35 U.S.C. 154(b) by 111 days.

(21) Appl. No.: 16/238,165

(22) Filed: Jan. 2, 2019

(65) Prior Publication Data

US 2020/0205348 A1    Jul. 2, 2020

(51) Int. Cl.
*A01F 15/08* (2006.01)
*A01F 15/07* (2006.01)

(52) U.S. Cl.
CPC .. *A01F 15/0833* (2013.01); *A01F 2015/0795* (2013.01); *A01F 2015/0808* (2013.01); *A01F 2015/0891* (2013.01)

(58) Field of Classification Search
CPC .............. A01F 15/0833; A01F 15/0875; A01F 2015/0795; A01F 2015/0808; A01F 2015/0891; G01G 19/02

USPC ........................................................ 100/82
See application file for complete search history.

(56) References Cited

U.S. PATENT DOCUMENTS

| 4,491,194 | A | 1/1985 | Mayfield |
| 6,457,295 | B1 | 10/2002 | Arnold |
| 7,024,989 | B2 * | 4/2006 | Preece ................ A01F 15/0883 100/87 |
| 7,064,282 | B2 | 6/2006 | Viand |
| 7,091,425 | B2 | 8/2006 | Viaud |
| 7,703,391 | B2 | 4/2010 | Duenwald |
| 9,297,688 | B2 | 3/2016 | Posselius |
| 10,036,563 | B2 | 7/2018 | Smith |

* cited by examiner

*Primary Examiner* — Shelley M Self
*Assistant Examiner* — Teresa A Guthrie
(74) *Attorney, Agent, or Firm* — Joseph R. Kelly; Kelly, Holt & Christenson PLLC (57) ABSTRACT

A bale holder is actuated to hold a bale in a lift gate of a baler. Lift gate actuators are then actuated to lift the gate, while it is holding the bale. A gate position sensor senses the position of the lift gate, and a force detector detects a force that is used in order to support the gate in the detected position. Bale weight generation logic then generates a bale weight based on the sensed lift gate position and the detected force. A control signal is generated based on the bale weight.

20 Claims, 5 Drawing Sheets

BALE WEIGHT MEASUREMENT AND CONTROL SYSTEM USING LIFTGATE

FIELD OF THE DESCRIPTION

The present description relates to weighing bales of harvested agricultural material. More specifically, the present description relates to using a baler lift gate to measure bale weight.

BACKGROUND

There are a wide variety of different types of agricultural machines that generate bales of agricultural material that has been harvested. Such balers can bale material like hay, straw, silage, etc.

It is not uncommon for operators to wish to know the weight of each bale. There are a variety of different reasons for this. For instance, the weight of the bale may be indicative of the moisture level of the baled material. The operator may wish to know this so that he or she can regulate the baling process based on the moisture content in a bale. Similarly, bales are often moved away from a field where they are harvested by loading them onto a transport vehicle. The transport vehicles are often rated to carry only a certain weight. Thus, knowing the weight of the bale can help in ensuring that the rated transport vehicle load is not exceeded. Further, bales may be sold based on weight.

In order to address this issue, some current systems have been implemented in round balers. The current systems use a wheel or spindle load measurement device which measures the load exerted on the wheel or spindle of the round baler. However, these systems can be expensive and inaccurate. It is not uncommon for the round baler, itself, to weigh several times as much as the bale that it is making. Therefore, even if the measurement device has a relatively low error, this can still result in a relatively high error in the bale weight measurement, because the load measuring device is also measuring the entire weight of the baler.

The discussion above is merely provided for general background information and is not intended to be used as an aid in determining the scope of the claimed subject matter.

SUMMARY

A bale holder is actuated to hold a bale in a lift gate of a baler. Lift gate actuators are then actuated to lift the gate, while it is holding the bale. A gate position sensor senses the position of the lift gate, and a force detector detects a force that is used in order to support the gate in the detected position. Bale weight generation logic then generates a bale weight based on the sensed lift gate position and the detected force. A control signal is generated based on the bale weight.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
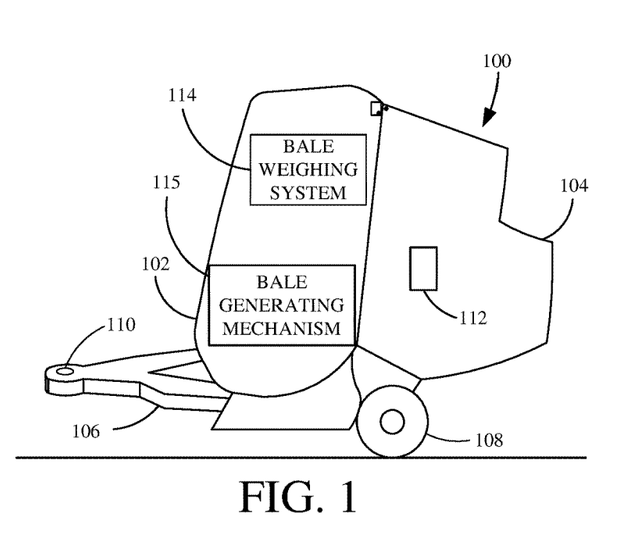
FIG. 1 is a side partial pictorial, partial schematic view of a baler with a lift gate in a closed position.

FIG. 1 is a side partial pictorial, partial schematic view of a baler 100 that generates round bales of harvested material (such as hay, straw, silage, etc.). In the example shown in FIG. 1, baler 100 illustratively includes a mainframe (or first housing portion) 102, lift gate 104, support frame 106 and ground-engaging elements (such as wheels) 108. A hitch 110 is provided so that a towing vehicle can tow baler 100 across a worksite (such as a field) where baling is to be performed. It will be noted that the present discussion applies to self-propelled balers as well, but continues with respect to a towed baler for the sake of example only.

FIG. 1 also shows that, in one example, baler 100 includes a bale weighing system 114, bale generating mechanism 115 and bale retaining mechanism 112. Bale generating mechanism 115 can be any of a wide variety of mechanisms that generate a bale in baler 100. Mechanism 112 can be actuated by an actuator to engage a bale, and hold it in lift gate 104, as the lift gate moves. Bale weighing system 114 can be used to weigh bales as they are ejected from baler 100. Bale weighing system 114 is described in greater detail below.

Figure 2:
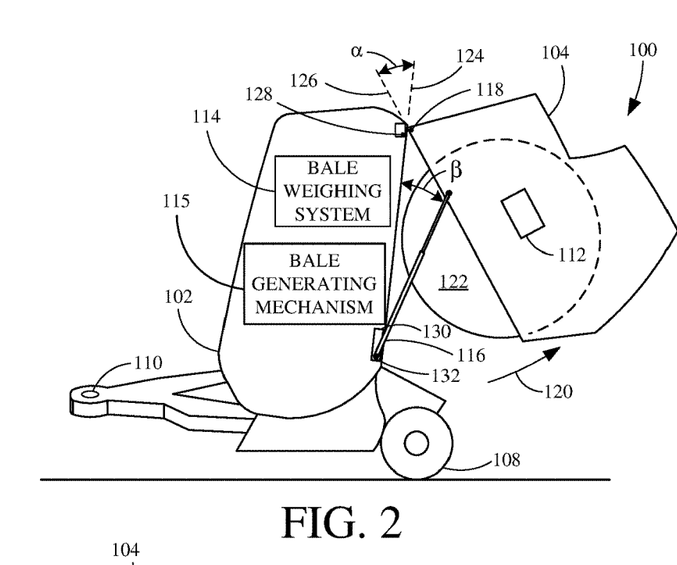
FIG. 2 is a side partial pictorial, partial schematic view of the baler illustrated in FIG. 1, with the lift gate in a lifted position.

FIG. 2 shows baler 100 and similar items are similarly numbered to those shown in FIG. 1. However, FIG. 2 shows that lift gate 104 is now in a lifted position.

In the example shown in FIG. 2, lift gate 104 is lifted by one or more lift actuators 116. In the example shown in FIG. 2, actuators 116 can include hydraulic actuators that are disposed on opposite sides of lift gate 104. Hydraulic actuators 116 are powered by a hydraulic system that can be located on a towing vehicle, or on baler 100 itself. Also, part of the hydraulic system (such as the system that provides hydraulic fluid under pressure) can be provided on the towing vehicle while another part of the hydraulic system (control valves, other hydraulic valves and actuators, hydraulic fluid conduits, etc.) can be disposed on baler 100. In either case, hydraulic fluid under pressure is provided to hydraulic cylinder(s) 116 to cause it to extend. Extension of hydraulic cylinder 116 causes lift gate 104 to pivot about a pivot axis 118 generally in the direction indicated by arrow 120. As actuator 116 extends, it rotates about axis of rotation 132 and causes an angle β (with which hydraulic actuator 116 is disposed relative to a generally vertical axis 124) to increase. Similarly, as actuator 116 extends, it lifts gate 104 so that an angle α (defined by an axis 126 that generally lies within the plane of an opening of lift gate 104, relative to vertical axis 124) to increase as well.

In one example, lift gate 104 defines a cavity in which bale 122 (or a portion of it) is formed. Before lift gate 104 is moved to the lifted position, bale weighing system 114 actuates bale retaining mechanism 112 so that it engages a round bale 122 that has been formed inside baler 100. Then, as lift gate 104 is moved to the lifted position shown in FIG. 2, by hydraulic actuator 116, mechanism 112 holds bale 122 at least partially inside the cavity defined by lift gate 104.

Also, in the example shown in FIG. 2, baler 100 can be provided with a position detector that detects a position of gate 104 and thus bale 122. For example, the position detector can be detector 128 that detects the position of rotation of lift gate 104 about axis 118. In another example, baler 100 can also (or instead) be provided with a position detector 130 that detects the angle β through which cylinder 116 moves as it lifts gate 104. The angle β can be calculated, without measuring it, by knowing the initial gate angle, and the geometry of the baler, and the extent to which cylinder 146 is extended. Knowing the orientation of baler 100 relative to the ground over which it is traveling can be obtained in other ways as well. Position detectors 128 and/or 130 can be any of a wide variety of different types of position detectors, such as angle encoders, Hall Effect sensors, rotational potentiometers, or a wide variety of other position sensors that can detect the degree of rotation of the sensed items (either lift gate 104 or actuator 116) about their axes of rotation.

As is described in greater detail below with respect to FIGS. 5 and 6, once bale 122 is suspended by lift gate 104, as shown in FIG. 2, the position of bale 122 can be identified. This can be done using one or both of sensors 128 and 130. Once the position of bale 122 is known, then bale weighing system 114 measures a force that is needed to hold bale 122 in the position shown in FIG. 2. That force will be indicative of the weight of bale 122.

In one example, sensor 130 includes a force sensor (with or without a position sensor) that senses a hydraulic pressure needed in cylinder 116 to hold lift gate 104 in the lifted position. In another example, bale retaining mechanism 112 can include a set of load pins that measure the force or load exerted by bale 122 on those pins when it is suspended by lift gate 104. Again, either or both of these metrics can be used to identify the weight of bale 122.

When the pressure in cylinder 116 is used to measure the weight of bale 122, then the angle α, β, or both, can be used to generate the weight of bale 122. Similarly, where load pins are used in bale retaining mechanism 112, that value can be used, along with the degree of elevation of lift gate 104 (so that it is known that bale 122 is being held free of any support by the lower portion of lift gate 104) can be used to determine the weight of bale 122 as well.

Figure 3:
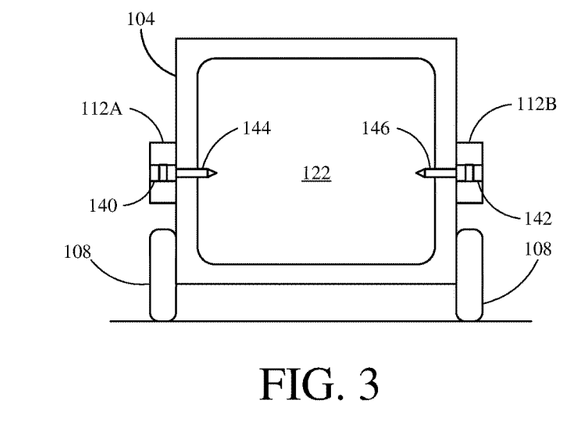
FIG. 3 is a partial sectional view of the baler illustrated in FIG. 1, showing one example of a first bale holder mechanism in more detail.
Figure 4:
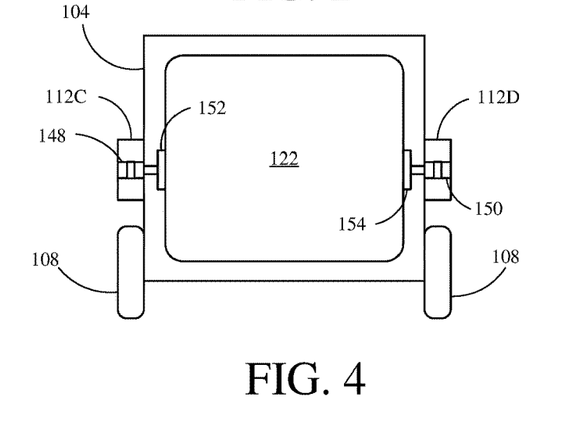
FIG. 4 is a partial sectional view of the baler shown in FIG. 1, showing one example of a second bale holder mechanism in more detail.

FIGS. 3 and 4 show two different examples of bale retaining mechanism 112. In FIG. 3, bale retaining mechanism 112 is shown as two separate mechanisms 112A and 112B that are disposed on opposite sides of the cavity defined by lift gate 104. Mechanisms 112A and 112B illustratively have hydraulically actuated cylinders 140, 142, respectively, that drive reciprocation of retaining pins 144, 146, respectively. As bale 122 is being formed within baler 100 (when lift gate 104 is lowered in the position shown in FIG. 1), actuators 140 and 142 are controlled to retract pins 144 and 146 to a retracted position where they do not engage bale 122. However, once bale 122 is formed and the lift gate is about to be lifted to eject bale 122 from baler 100, then actuators 140 and 142 are controlled to move pins 144 and 146 to an extended position (such as that shown in FIG. 3) where they pierce and engage bale 122 to hold bale 122 in lift gate 104, as it is lifted to the lifted position shown in FIG. 2. Then, a pressure transducer that measures the pressure in lift cylinder 116 can be used, or load pins disposed in reciprocating pins 144 and 146 can be used, to measure the load on lift gate 104 as it is holding bale 122 suspended and thus to calculate the weight of bale 102.

FIG. 4 is similar to FIG. 3, and similar items are similarly numbered. However, in FIG. 4, bale retaining mechanisms 112 are shown as two separate bale retaining mechanisms 112C and 112D. These mechanisms each include an actuator (such as a hydraulic cylinder 148 and 150, respectively), that move bale-engaging members 152 and 154, respectively, between a retracted position in which they are out of engagement with bale 122 and an extended position in which they are extended toward, and engage bale 122, thus squeezing bale 122 between them, so that bale 122 can be lifted along with lift gate 104.

Figure 5:
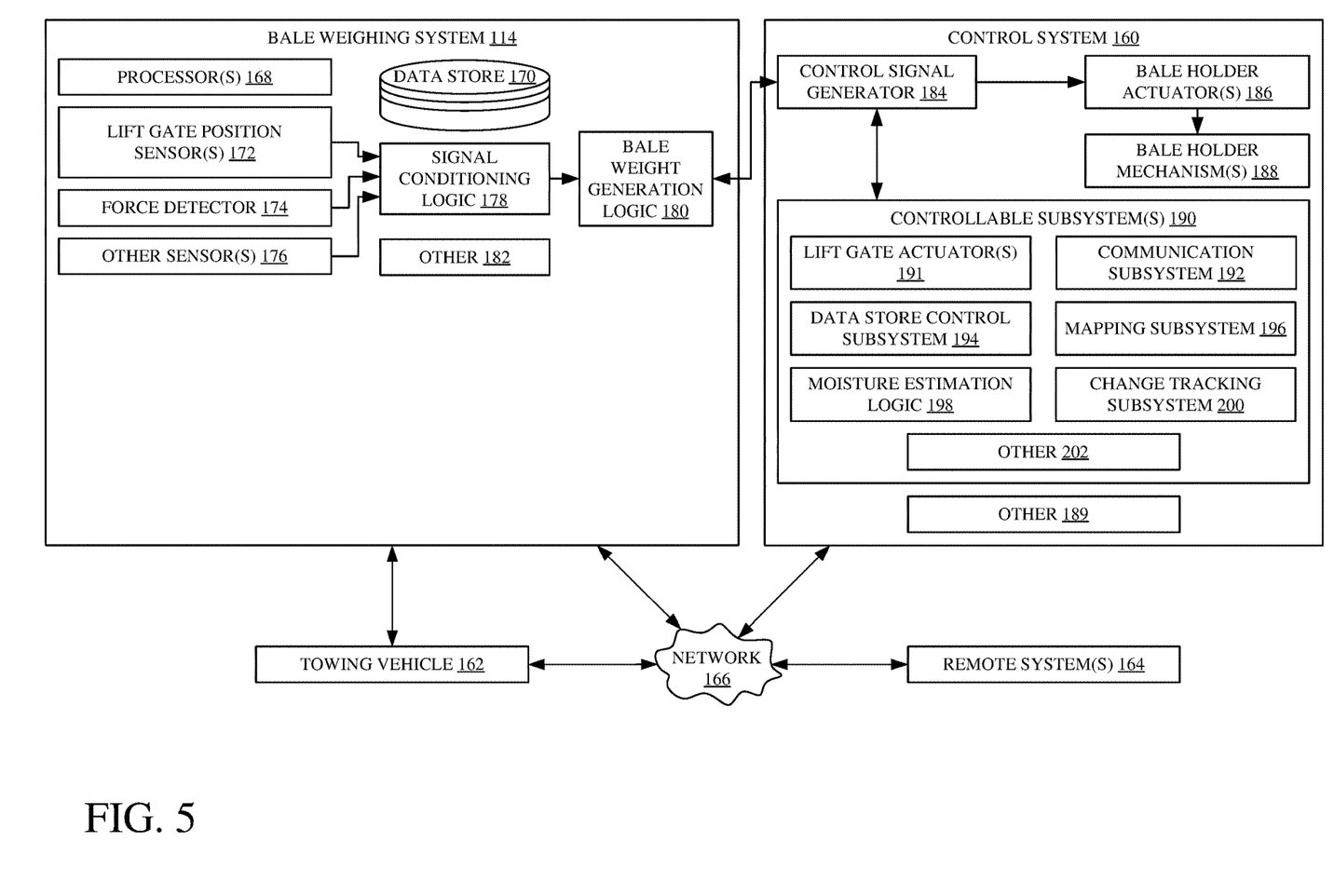
FIG. 5 is a block diagram showing one example of a bale weighing system and a control system, in more detail.

FIG. 5 is a block diagram showing, one example of bale weighing system 114 along with a control system 160. Again, it will be noted that portions of bale weighing system 114 and/or control system 160 can be disposed on a towing vehicle 162 that tows baler 100, or they can be disposed on baler 100, or they can be disposed on a remote system 164 that may be accessible by other components over a network 166. Network 166 can be any of a wide variety of different types of networks, such as a local area network, a wide area network, a near field communication network, a controller area network (CAN) system, a cellular communication network, or a wide variety of other networks or combinations of networks.

In the example shown in FIG. 5, bale weighing system 114 includes one or more processors 168, data store 170, lift gate position sensors 172 (which can be position sensor 128 and/or sensor 130 or another sensor), force detector 174 (which can include a force detector that detects a pressure in cylinder 116, load pins disposed to measure the load of bale 122—such as load pins disposed on bale retaining pains 144 and 146 shown in FIG. 3 or a different sensor), and it can include a wide variety of other sensors 176. Sensors 176 can include such things as a position sensor (e.g., a global positioning system—GPS—receiver, or other position sensor), various sensors that sense characteristics or operational variables of baler 100 or the material being baled by baler 100, or other sensors. Bale weighing system 114 also illustratively includes signal conditioning logic 178, bale weight generation logic 180, and it can include a wide variety of other items 182.

Signal conditioning logic 178 can perform a wide variety of different types of signal conditioning on the sensor signals. For instance, it can perform amplification, linearization, normalization, compensation, filtering, noise reduction, and a wide variety of other conditioning steps.

Bale weight generation logic 180 receives the conditioned sensor signals and generates a bale weight metric indicative of the weight of bale 122 and generates a signal indicative of this. It can do this by performing a dynamic calculation or by comparing the position and force values sensed by sensor 172 and detector 174 to reference data that may be stored in data store 170 and has a corresponding bale weight metric.

Control system 160 illustratively includes control signal generator 184 which receives the bale weight signal generated by bale weight generation logic 180. Control system 160 also illustratively includes bale holder actuators 186 (which may be actuators 140, 142, 148 and 150 shown in FIGS. 3 and 4, respectively, or other actuators, as well as bale holder mechanisms 188 (which may be reciprocating pins 144 and 146 in FIG. 3 or bale squeezing mechanisms 152 and 154 shown in FIG. 4, or other mechanisms). Control system 160 can also include a wide variety of other controllable subsystems 190 and other items 189.

Controllable subsystems 190 can include lift gate actuators 191 (such as cylinders 116 shown in FIG. 2), a communication subsystem 192, data store control subsystem 194, mapping subsystem 196, moisture estimation logic 198, change tracking subsystem 200, and they can include a wide variety of other subsystems 202. Communication subsystem 192 is illustratively used to facilitate communication among the various items shown in FIG. 5. For instance, it can communicate a signal indicative of the bale weight (generated by bale weight generation logic 180) to a user interface mechanism in towing vehicle 162, so that the bale weight is surfaced for the operator of towing vehicle 162.

Communication subsystem 192 may instead, or also, communicate the bale weight to a remote system 164. Remote system 164 may be a remote computing system (such as a cloud-based computing system or other remote server computing system) or it may be a system in another vehicle. For instance, it may be that the bales generated by baler 100 are staged by a staging vehicle in different areas, so that they can be loaded onto a transport vehicle. In another example, the bales are simply loaded onto a transport vehicle without first being staged. In either of those or other scenarios, it may be helpful to know the weight of the bales so that the transport vehicle is not overloaded, but is loaded efficiently. Thus, in one example, communication system 192 communicates a geographic location where bale 122 was dropped, along with its weight. Then, when a loading vehicle picks up bale 122, it can correlate the weight of the bale to its geographic location. The control system can aggregate the weights of bales that are loaded onto a transport vehicle, or those weights can be aggregated elsewhere. In this way, the overall load carried by the transport vehicle can be controlled so that it is near the rated load for the transport vehicle, but not in excess of that load.

Data store control subsystem 194 can be used to control data store 170 to store the weight of the bale in data store 170. In another example, data store control subsystem 194 can be used to control a remote data store, on a remote system 164, to store the bale weight.

Mapping subsystem 196 illustratively correlates the geographic location of the bale to its weight. In this way, it can generate a map showing bale weights at different geographical locations in the field on which the bale is being generated. Such a map can be used in a wide variety of different ways. For instance, it can be used to identify productivity of the field in different geographic locations. It can be used to identify where fertilizer or other applications are to be made. It can be used to identify where crop needs to be replanted, among other things.

Moisture estimation logic 198 can be used to estimate the moisture content of the bale, given its weight. By way of example, logic 198 may include, or have access to, curves that map bale weight, for different crops and for different bale sizes, to moisture content. The volumetric size of the bale may be known or preset by the operator of towing vehicle 162, or it may be a default volumetric size. A dynamic calculation can be performed to identify the moisture content based upon the size and weight of the bale, as it is being released from baler 100, or the volume of the bale can be assumed based upon a default value, and the weight of bale can then be compared against reference weight values that have corresponding moisture content values. These and other ways of estimating the moisture content of the bale, based on its weight, can be used by moisture estimation logic 198, once the weight of the bale is known.

Change tracking subsystem 200 illustratively tracks the change in bale weight over time. By way of example, it may be that an operator is baling a field and the bale weights decrease as the operation proceeds, because the harvested material is becoming drier, during the day. However, at the end of the day, dew may begin forming on the harvested material so that the bale weights begin to increase. At that point, once a given increase in bale weight has been reached, the operator may wish to stop baling for the day and commence baling again the next day, so that the moisture content in the bales does not become too high. In one example, when the bale weight increases by a threshold amount, this is detected by change tracking subsystem 200, which generates an alert message that can be communicated to the operator of towing vehicle 162 (or to a farm manager or other person at one of the remote systems 164) by communication subsystem 192.

It will be appreciated that these are just some examples of controllable subsystems 190 that can be controlled by control signal generator 184 based upon the bale weight generated by bale weight generation logic 180. Other control systems 202 can be controlled to perform other functions as well.

Figure 6:
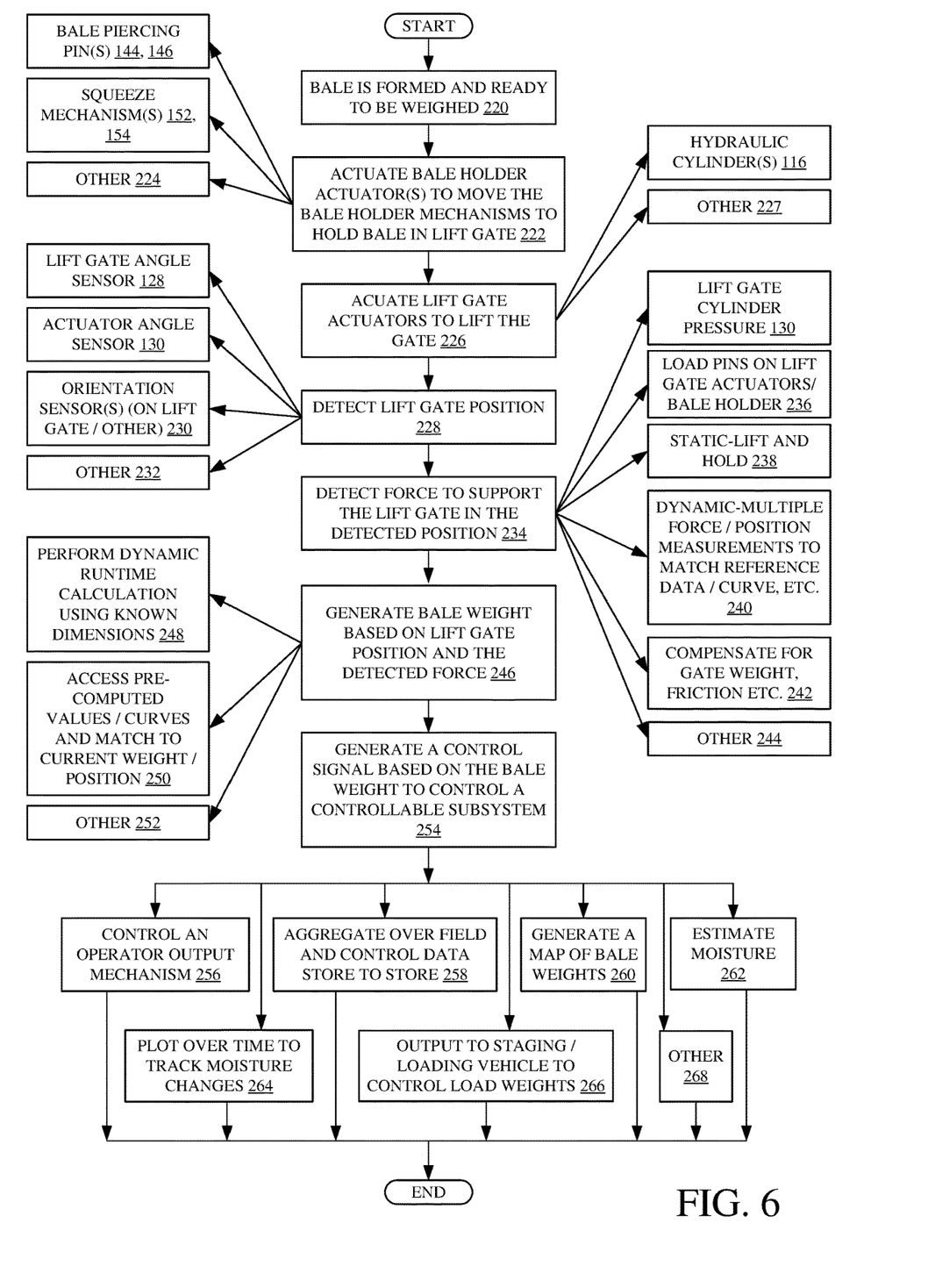
FIG. 6 is a flow diagram illustrating one example of the operation of the bale weighing system and the control system shown in FIG. 5.

FIG. 6 is a flow diagram illustrating one example of the operation of bale weighing system 114 and control system 160 in generating a bale weight, and a corresponding action signal, by retaining bale 122 within lift gate 104 as lift gate 104 is lifted. It is first assumed that bale generating mechanism 115 has generated bale 122 within baler 100, and it is ready to be ejected (or weighed). This is indicated by block 220 in the flow diagram of FIG. 6. For instance, it may be that the completion of the bale 122 is automatically detected, or it is detected by the operator, or it is detected in some other way.

Once the bale has been formed, control signal generator 184 generates a control signal and provides it to bale holder actuators 186. Bale holder actuators 186 can be the hydraulic cylinders 140, 142 shown in FIG. 3 or cylinders 148 and 150 shown in FIG. 4, which are actuated so that the corresponding bale holder mechanisms (e.g., reciprocal pins 144 and 146 or squeezing mechanisms 152 and 154) engage bale 122 to hold it within lift gate 104. Actuating the bale holder actuators to hold the bale 122 in the lift gate 104 is indicated by block 222 in the flow diagram of FIG. 6. Again, they can be reciprocal bale piercing pins 144, 146, they can be squeeze mechanisms 152, 154, or they can be other bale holding mechanisms 224 as well.

Once the bale holder mechanisms are actuated to hold bale 122 within lift gate 104, then control signal generator 184 generates a control signal to control lift gate actuators 191 to drive movement of lift gate 104 to the lifted position. Actuating the lift gate actuators to lift lift gate 104 is indicated by block 226 in the flow diagram of FIG. 6. The lift gate actuators can include hydraulic cylinders (such as cylinders 116 shown in FIG. 2) or they can include a wide variety of other lift gate actuators, as indicated by block 227.

Lift gate position sensors 172 then detect the lift gate position. This is indicated by block 228. By way of example, the lift gate sensors can include lift gate angle sensor 128 shown in FIG. 2, the actuator angle sensor 130 shown in FIG. 2, an orientation sensor (which may be located on the lift gate 104 and sense its orientation relative to a gravity vector or otherwise) as indicated by block 230 in the flow diagram of FIG. 6, or it can include a wide variety of other sensors that sense the position of lift gate 104, and thus the position of bale 122 within lift gate 104. Sensing the lift gate position in other ways is indicated by block 232.

Force detector 174 then detects the force needed to support the lift gate 104 in the detected, lifted, position. This is indicated by block 234 in the flow diagram of FIG. 6. In one example, the force detector 174 is the lift gate cylinder pressure sensor 130 (with or without a position sensor) shown in FIG. 2. It can be a set of load pins 236 on the reciprocal pins 144 and 146 shown in FIG. 3 or on the lift gate actuators (such as cylinders 116). It can be a wide variety of other force detectors as well.

It should also be noted that detecting the lift gate position and support force can be performed in a static lift and hold operation as indicated by block 238. For instance, control signal generator 184 can generate a control signal to control lift gate actuators 191 to lift lift gate 104 to a desired position and hold it there, while the force measurement is taken. In another example, a dynamic measurement can be taken in which multiple lift gate position measurements are taken to measure the position of lift gate 104, as it is lifted in the direction indicated by arrow 120 shown in FIG. 2, or in the opposite direction. Force measurements can also be detected by force detector 174 at those different positions, as lift gate 104 is lifted. The sets of lift gate position and corresponding force measurements can then be compared to reference data, such as a curve that is mapped to reference position and force measurements. Each of the curves in the reference data may correspond to a different bale weight. Thus, the measured position and force data can be matched to a closest reference curve so the corresponding bale weight can be identified. The bale weight measurement can thus be generated in a dynamic way so that the bale need not be statically held in a certain position, in order to identify its weight. Making the dynamic bale weight position measurement is indicated by block 240 in the flow diagram of FIG. 6.

It will be noted that, during the bale weight measurement, signal conditioning logic 178 may perform a number of different functions. For instance, it can compensate for the pre-existing weight of lift gate 104, when determining the weight of bale 122. In addition, where the dynamic bale weight measurement is performed, it can also compensate for friction encountered in lifting gate 104. It can perform other compensation functions as well. Compensating the sensor signal values for known sources of error or pre-existing characteristics is indicated by block 242 in the flow diagram of FIG. 6. The force can be detected in a wide variety of other ways as well, and this is indicated by block 244.

Bale weight generation logic 180, having received the lift gate position signal and the force signal, then generates the bale weight based on the lift gate position and the detected force. This is indicated by block 246 in the flow diagram of FIG. 6. Again, it can perform a runtime calculation using the known dimensions of the lift gate actuators, and the lift gate 104, itself, the measured angles α and/or β, the measured forces from load pins and/or force sensor 130, and a wide variety of other information. Performing a runtime calculation is indicated by block 248. It can also access pre-computed values or curves and match the existing position and force values against those pre-computed values or curves to identify the weight of bale 122. This is indicated by block 250. Bale weight generation logic 180 can generate the bale weight in a wide variety of other ways as well, and this is indicated by block 252.

Once the bale weight is known, control signal generator 184 illustratively generates a control signal (or action signal) based upon the bale weight in order to control a controllable subsystem 190. This is indicated by block 254 in the flow diagram of FIG. 6. By way of example, communication subsystem 192 can control an operator output mechanism that displays or otherwise surfaces the bale weight for the operator. The operator output mechanism may be a display, an audible alarm or other audible output mechanism, a haptic feedback mechanism or a wide variety of operator output mechanisms. This is indicated by block 256.

The data store control subsystem 194 may aggregate the values over a field or other worksite, and control data store 170 (or a remote data store) to store the values. This is indicated by block 258.

Mapping subsystem 196 can correlate the weight values to geographic position to generate a map of bale weights. This is indicated by block 260.

Moisture estimation logic 198 can use the bale weight (and changes in the bale weight) to estimate moisture content in the harvested material. This is indicated by block 262.

Change tracking subsystem 200 can plot or otherwise identify changes in the bale weight over time to track changes in moisture, or for other reasons. This is indicated by block 264.

Control signal generator 184 can also control communication subsystem 192 to output the weight to a staging or loading vehicle to control the weight loaded on a transport vehicle. This is indicated by block 266.

Control signal generator 184 can generate control signals in a wide variety of other ways, to control a wide variety of other controllable subsystems as well. This is indicated by block 268.

The present discussion has mentioned processors and servers. In one example, the processors and servers include computer processors with associated memory and timing circuitry, not separately shown. They are functional parts of the systems or devices to which they belong and are activated by, and facilitate the functionality of the other components or items in those systems.

It will be noted that the above discussion has described a variety of different systems, components and/or logic. It will be appreciated that such systems, components and/or logic can be comprised of hardware items (such as processors and associated memory, or other processing components, some of which are described below) that perform the functions associated with those systems, components and/or logic. In addition, the systems, components and/or logic can be comprised of software that is loaded into a memory and is subsequently executed by a processor or server, or other computing component, as described below. The systems, components and/or logic can also be comprised of different combinations of hardware, software, firmware, etc., some examples of which are described below. These are only some examples of different structures that can be used to form the systems, components and/or logic described above. Other structures can be used as well.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 7:
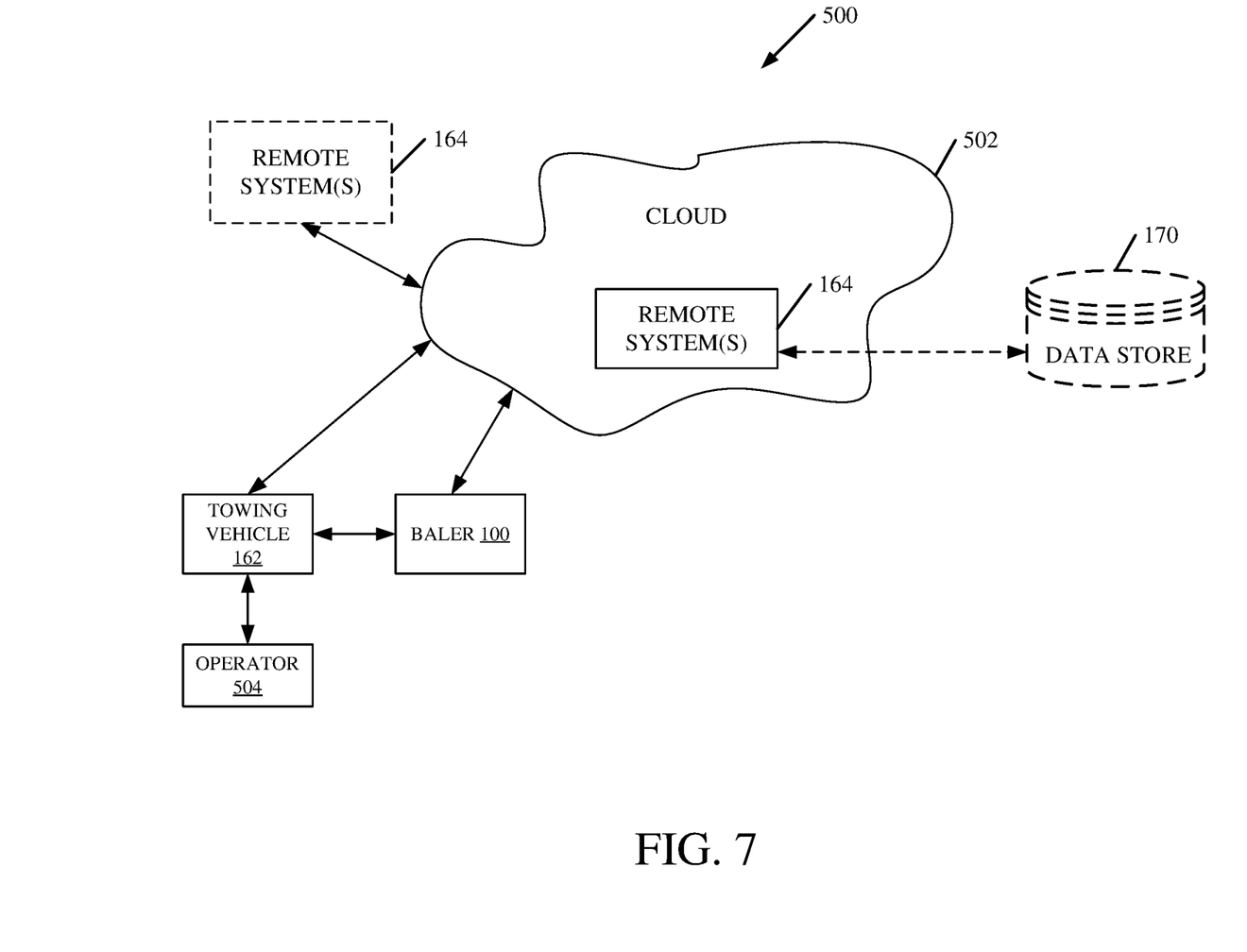
FIG. 7 is a block diagram showing one example of the bale weighing system and control system deployed in a remote server architecture.

FIG. 7 is a block diagram of baler 100, shown in FIG. 1, except that it communicates with elements in a remote server architecture 500. In an example, remote server architecture 500 can provide computation, software, data access, and storage services that do not require end-user knowledge of the physical location or configuration of the system that delivers the services. In various examples, remote servers can deliver the services over a wide area network, such as the internet, using appropriate protocols. For instance, remote servers can deliver applications over a wide area network and they can be accessed through a web browser or any other computing component. Software or components shown in FIG. 5 as well as the corresponding data, can be stored on servers at a remote location. The computing resources in a remote server environment can be consolidated at a remote data center location or they can be dispersed. Remote server infrastructures can deliver services through shared data centers, even though they appear as a single point of access for the user. Thus, the components and functions described herein can be provided from a remote server at a remote location using a remote server architecture. Alternatively, they can be provided from a conventional server, or they can be installed on client devices directly, or in other ways.

In the example shown in FIG. 7, some items are similar to those shown in FIG. 5 and they are similarly numbered. FIG. 7 specifically shows baler 100 pulled by towing vehicle 162 which is operated by operator 504. Either or both vehicle 162 and baler 100 can communicate with remote system 164 which can be located at a remote server location 502.

FIG. 7 also depicts another example of a remote server architecture. FIG. 7 shows that it is also contemplated that some elements of FIG. 5 can be disposed at remote server location 502 while others are not. By way of example, data store 114 or other items, can be disposed at a location separate from location 502, and accessed through the remote server at location 502. Regardless of where they are located, they can be accessed directly by machines 162, 100 through a network (either a wide area network or a local area network), they can be hosted at a remote site by a service, or they can be provided as a service, or accessed by a connection service that resides in a remote location. Also, the data can be stored in substantially any location and intermittently accessed by, or forwarded to, interested parties. For instance, physical carriers can be used instead of, or in addition to, electromagnetic wave carriers. In such an example, where cell coverage is poor or nonexistent, another mobile machine (such as a fuel truck) can have an automated information collection system. As the vehicle 162 and/or baler 100 come close to the fuel truck for fueling, the system automatically collects the information from the vehicle 162/baler 100 using any type of ad-hoc wireless connection. The collected information can then be forwarded to the main network as the fuel truck reaches a location where there is cellular coverage (or other wireless coverage). For instance, the fuel truck may enter a covered location when traveling to fuel other machines or when at a main fuel storage location. All of these architectures are contemplated herein. Further, the information can be stored on the vehicle 162/baler 100 until that machine enters a covered location. The vehicle 162/baler 100, itself, can then send the information to the main network.

It will also be noted that the elements of FIG. 5, or portions of them, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 8:
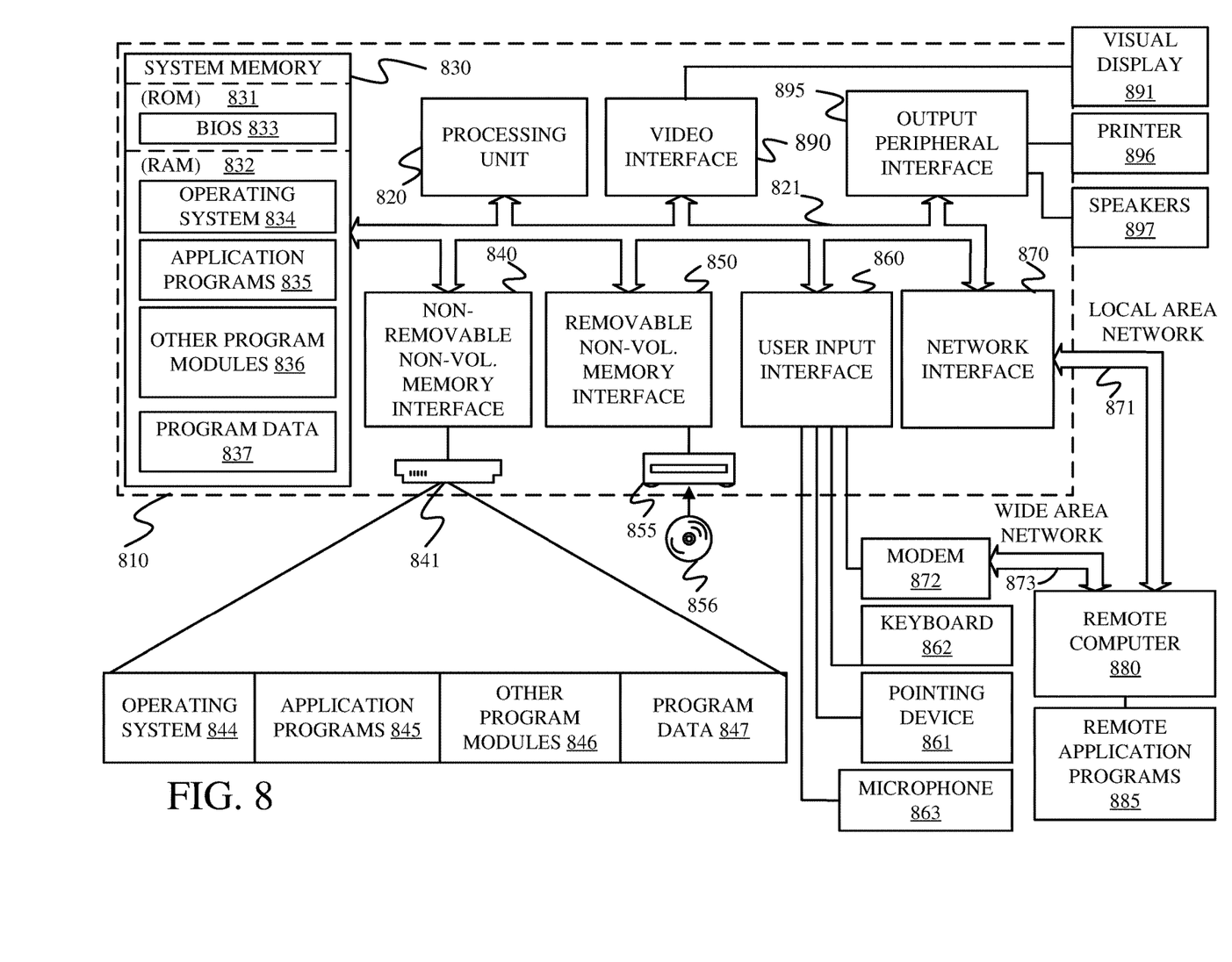
FIG. 8 is a block diagram showing one example of a computing environment that can be used in the architectures shown in the previous figures.

FIG. 8 is one example of a computing environment which can be configured so elements of FIG. 5, or parts of it, (for example) can be deployed thereon. With reference to FIG. 8, an example system for implementing some embodiments includes a general-purpose computing device in the form of a computer 810. Components of computer 810 may include, but are not limited to, a processing unit 820 (which can comprise a processor or server from previous FIGS.), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. Memory and programs described with respect to FIG. 5 can be deployed in corresponding portions of FIG. 8.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media may embody computer readable instructions, data structures, program modules or other data in a transport mechanism and includes any information delivery media. The term "modulated data signal" means a signal that has one or more of its characteristics set or changed in such a manner as to encode information in the signal.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 8 illustrates operating system 834, application programs 835, other program modules 836, and program data 837.

The computer 810 may also include other removable/non-removable volatile/nonvolatile computer storage media. By way of example only, FIG. 8 illustrates a hard disk drive 841 that reads from or writes to non-removable, nonvolatile magnetic media, nonvolatile magnetic disk 852, an optical disk drive 855, and nonvolatile optical disk 856. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (e.g., ASICs), Application-specific Standard Products (e.g., ASSPs), System-on-a-chip systems (SOCs), Complex Programmable Logic Devices (CPLDs), etc.

The drives and their associated computer storage media discussed above and illustrated in FIG. 8, provide storage of computer readable instructions, data structures, program modules and other data for the computer 810. In FIG. 8, for example, hard disk drive 841 is illustrated as storing operating system 844, application programs 845, other program modules 846, and program data 847. Note that these components can either be the same as or different from operating system 834, application programs 835, other program modules 836, and program data 837.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures. A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections (such as a local area network—LAN, or wide area network WAN) to one or more remote computers, such as a remote computer 880.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. In a networked environment, program modules may be stored in a remote memory storage device. FIG. 8 illustrates, for example, that remote application programs 885 can reside on remote computer 880.

It should also be noted that the different examples described herein can be combined in different ways. That is, parts of one or more examples can be combined with parts of one or more other examples. All of this is contemplated herein.

Example 1 is a baler, comprising:
a bale generating mechanism that generates a bale of material;
a first housing;
a lift gate pivotally movable, relative to the first housing, between a closed position and a lifted position;
a bale retaining mechanism that is actuatable to engage the bale, so the bale is lifted with the lift gate as the lift gate moves from the closed position to the lifted position; and
a bale weighing system that generates a bale weight metric indicative of a weight of the bale when the bale is lifted by the lift gate.

Example 2 is the baler of any or all previous examples and further comprising:
a controllable subsystem; and
a control signal generator configured to generate a control signal to control the controllable subsystem based on the weight metric.

Example 3 is the baler of any or all previous examples wherein the bale weighing system comprises:
a position sensor configured to sense a position variable indicative of a lift gate position and generate a position signal indicative of a value of the position variable.

Example 4 is the baler of any or all previous examples wherein the bale weighing system comprises:
a force detector configured to detect a force variable indicative of a force used to support the lift gate in the lift gate position and to generate a force signal indicative of a value of the force variable.

Example 5 is the baler of any or all previous examples wherein the bale weighing system comprises:
bale weight generation logic configured to receive the position signal and the force signal and generate the bale weight metric based on the value of the position variable and the value of the force variable.

Example 6 is the baler of any or all previous examples and further comprising:
a lift gate actuator configured to drive movement of the lift gate from the closed position to the lifted position.

Example 7 is the baler of any or all previous examples wherein the force detector is configured to detect a force used by the lift gate actuator to support the lift gate in the lifted position.

Example 8 is the baler of any or all previous examples wherein the lift gate actuator comprises:
a hydraulic cylinder and wherein the force detector is configured to detect a hydraulic pressure in the hydraulic cylinder when the lift gate actuator is supporting the lift gate in the lifted position Example 9 is the baler of any or all previous examples wherein the lift gate is pivotable relative to the first housing, about a pivot axis, and wherein the position sensor comprises:
an angle sensor configured to sense an angle to which the lift gate has pivoted about the pivot axis.

Example 10 is the baler of any or all previous examples wherein the lift gate defines a bale receiving cavity that receives a portion of the bale, and wherein the bale retaining mechanism comprises:
a first actuator; and
a first bale engaging member, coupled to the lift gate on a first side of the bale receiving cavity, the first actuator configured to drive movement of the first bale engaging member to engage the bale.

Example 11 is the baler of any or all previous examples wherein the bale retaining mechanism comprises:
a second actuator; and
a second bale engaging member, coupled to the lift gate on a second side of the bale receiving cavity opposite the first side, the second actuator configured to drive movement of the second bale engaging member to engage the bale.

Example 12 is the baler of any or all previous examples wherein the force detector comprises:
a load pin on at least one of the first and second bale engaging members to detect a force exerted by the bale on the at least one bale engaging member.

Example 13 is a baler, comprising:
a bale generating mechanism that generates a bale of material;
a first housing;
a lift gate pivotally movable, relative to the first housing, between a closed position and a lifted position;
a lift gate actuator that is actuated to drive movement of the lift gate from the closed position to the lifted position;
a bale retaining mechanism that is actuatable to engage the bale, so the bale is lifted with the lift gate as the lift gate moves from the closed position to the lifted position;
a position sensor configured to sense a position variable indicative of a lift gate position and generate a position signal indicative of a value of the position variable;
a force detector configured to detect a force variable indicative of a force used to support the lift gate in the lift gate position and to generate a force signal indicative of a value of the force variable; and
a bale weighing system that receives the force signal and the position signal and generates a bale weight metric indicative of a weight of the bale when the bale is lifted by the lift gate based on the value of the force variable and the value of the position variable.

Example 14 is the baler of any or all previous examples wherein the baler is towed by a towing vehicle and further comprising:
a control system; and
a communication subsystem, the control system generating a control signal to control the communication subsystem to communicate the weight metric to a user interface mechanism on the towing vehicle.

Example 15 is the baler of any or all previous examples and further comprising a position sensor configured to sense a geographic position of the baler and further comprising:
a control system; and
a mapping subsystem configured to correlate the weight metric to a corresponding geographic position, the control system generating a control signal to control the mapping subsystem to generate a weight map based on the weight metric and the corresponding geographic position.

Example 16 is the baler of any or all previous examples and further comprising:
a control system; and
moisture estimation logic, the control system generating a control signal to control the moisture estimation logic to estimate a moisture level of the bale and to generate a moisture metric signal indicative of the estimated moisture.

Example 17 is a method of controlling a baler, comprising:
generating a bale of material in a chamber defined by a first housing and a lift gate pivotally movable, relative to the first housing, between a closed position and a lifted position;
actuating a bale retaining mechanism to engage the bale so the bale is lifted with the lift gate as the lift gate moves from the closed position to the lifted position;
actuating a lift gate actuator to drive movement of the lift gate from the closed position to the lifted position;
sensing a position variable indicative of lift gate position;
generating a position signal indicative of a value of the position variable;
detecting a force variable indicative of a force used to support the lift gate in the lift gate position;
generating a force signal indicative of a value of the force variable; and
generating a bale weight metric indicative of a weight of the bale when the bale is lifted by the lift gate, based on the value of the position variable and the value of the force variable.

Example 18 is the method of any or all previous examples and further comprising:
a controllable subsystem; and
a control signal generator configured to generate a control signal to control the controllable subsystem based on the weight metric.

Example 19 is the method of any or all previous examples wherein detecting the force variable comprises:
detecting a force used by the lift gate actuator to support the lift gate in the lifted position.

Example 20 is the method of any or all previous examples wherein the lift gate is pivotable relative to the first housing, about a pivot axis, and wherein sensing a position variable comprises:
sensing an angle to which the lift gate has pivoted about the pivot axis.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:
1. A baler that generates a bale of material, comprising:
a first housing;
a lift gate pivotally movable, relative to the first housing, between a closed position and a lifted position;
an actuator that is actuatable to move a moveable member to engage the bale, so the bale is lifted with the lift gate as the lift gate moves from the closed position to the lifted position; and
a bale weighing system that generates a bale weight metric indicative of a weight of the bale when the bale is lifted by the lift gate.
2. The baler of claim 1 and further comprising:
a controllable subsystem; and
a control signal generator configured to generate a control signal to control the controllable subsystem based on the weight metric.
3. The baler of claim 1 wherein the bale weighing system comprises:
a position sensor configured to sense a position variable indicative of a lift gate position and generate a position signal indicative of a value of the position variable.

4. The baler of claim 3 wherein the bale weighing system comprises:
a force detector configured to detect a force variable indicative of a force used to support the lift gate in the lift gate position and to generate a force signal indicative of a value of the force variable.

5. The baler of claim 4 wherein the bale weighing system comprises:
bale weight generation logic configured to receive the position signal and the force signal and generate the bale weight metric based on the value of the position variable and the value of the force variable.

6. The baler of claim 5 and further comprising:
a lift gate actuator configured to drive movement of the lift gate from the closed position to the lifted position.

7. The baler of claim 6 wherein the force detector is configured to detect a force used by the lift gate actuator to support the lift gate in the lifted position.

8. The baler of claim 7 wherein the lift gate actuator comprises:
a hydraulic cylinder and wherein the force detector is configured to detect a hydraulic pressure in the hydraulic cylinder when the lift gate actuator is supporting the lift gate in the lifted position.

9. The baler of claim 3 wherein the lift gate is pivotable relative to the first housing, about a pivot axis, and wherein the position sensor comprises:
an angle sensor configured to sense an angle to which the lift gate has pivoted about the pivot axis.

10. The baler of claim 4 wherein the lift gate defines a bale receiving cavity that receives a portion of the bale, and wherein the actuator comprises a first actuator and the moveable member comprises a first moveable member, coupled to the lift gate on a first side of the bale receiving cavity, the first actuator configured to drive movement of the first moveable member to engage the bale.

11. The baler of claim 10 and further comprising:
a second actuator; and
a second moveable member, coupled to the lift gate on a second side of the bale receiving cavity opposite the first side, the second actuator configured to drive movement of the second moveable member to engage the bale.

12. The baler of claim 11 wherein the force detector comprises:
a load pin on at least one of the first and second moveable members to detect a force exerted by the bale on the at least one moveable member.

13. A baler that generates a bale of material, comprising:
a first housing;
a lift gate pivotally movable, relative to the first housing, between a closed position and a lifted position;
a lift gate actuator that is actuated to drive movement of the lift gate from the closed position to the lifted position;
a bale retaining mechanism that includes an actuator that is actuatable to move a moveable member to engage the bale, so the bale is lifted with the lift gate as the lift gate moves from the closed position to the lifted position;
a position sensor configured to sense a position variable indicative of a lift gate position and generate a position signal indicative of a value of the position variable;
a force detector configured to detect a force variable indicative of a force used to support the lift gate in the lift gate position and to generate a force signal indicative of a value of the force variable; and
a bale weighing system that receives the force signal and the position signal and generates a bale weight metric indicative of a weight of the bale when the bale is lifted by the lift gate based on the value of the force variable and the value of the position variable.

14. The baler of claim 13 wherein the baler is towed by a towing vehicle and further comprising:
a control system; and
a communication subsystem, the control system generating a control signal to control the communication subsystem to communicate the weight metric to a user interface mechanism on the towing vehicle.

15. The baler of claim 13 and further comprising a position sensor configured to sense a geographic position of the baler and further comprising:
a control system; and
a mapping subsystem configured to correlate the weight metric to a corresponding geographic position, the control system generating a control signal to control the mapping subsystem to generate a weight map based on the weight metric and the corresponding geographic position.

16. The baler of claim 13 and further comprising:
a control system; and
moisture estimation logic, the control system generating a control signal to control the moisture estimation logic to estimate a moisture level of the bale and to generate a moisture metric signal indicative of the estimated moisture.

17. A method of controlling a baler, comprising:
generating a bale of material in a chamber defined by a first housing and a lift gate pivotally movable, relative to the first housing, between a closed position and a lifted position;
actuating a bale retaining mechanism to engage the bale so the bale is lifted with the lift gate as the lift gate moves from the closed position to the lifted position;
actuating a lift gate actuator to drive movement of the lift gate from the closed position to the lifted position;
sensing a position variable indicative of lift gate position;
generating a position signal indicative of a value of the position variable;
detecting a force variable indicative of a force used to support the lift gate in the lift gate position;
generating a force signal indicative of a value of the force variable; and
generating a bale weight metric indicative of a weight of the bale when the bale is lifted by the lift gate, based on the value of the position variable and the value of the force variable.

18. The method of claim 17 and further comprising:
a controllable subsystem; and
a control signal generator configured to generate a control signal to control the controllable subsystem based on the weight metric.

19. The method of claim 17 wherein detecting the force variable comprises:
detecting a force used by the lift gate actuator to support the lift gate in the lifted position.

20. The method of claim 19 wherein the lift gate is pivotable relative to the first housing, about a pivot axis, and wherein sensing a position variable comprises:
sensing an angle to which the lift gate has pivoted about the pivot axis.

* * * * *